United States Patent
Chavez (10) Patent No.: US 12,308,871 B1
(45) Date of Patent: May 20, 2025

(54) EFFICIENT CROSS-CORRELATION WITH ADAPTIVE POLAR QUANTIZATION

(71) Applicant: Rockwell Collins, Inc., Cedar Rapids, IA (US)

(72) Inventor: Carlos J. Chavez, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 65 days.

(21) Appl. No.: 18/370,212

(22) Filed: Sep. 19, 2023

(51) Int. Cl.
*H04B 1/10* (2006.01)

(52) U.S. Cl.
CPC ................... *H04B 1/1027* (2013.01)

(58) Field of Classification Search
CPC ..................................... H04B 1/1027
See application file for complete search history.

(56) References Cited

U.S. PATENT DOCUMENTS

| | | |
|---|---|---|
| 8,488,720 B1 | 7/2013 | Chavez |
| 8,923,414 B2 | 12/2014 | Gunawardena et al. |
| 9,178,546 B1* | 11/2015 | Klemes ............ H04B 1/123 |
| 2021/0119661 A1* | 4/2021 | Murali ............ H04B 1/40 |

* cited by examiner

*Primary Examiner* — Janice N Tieu
(74) *Attorney, Agent, or Firm* — Suiter Swantz IP (57) ABSTRACT

A system and method for signal cross-correlation using adaptive polar quantization and polar multiplication is disclosed. The method includes receiving a first and second complex signal. The method includes computing a first quantized phase and a first quantized magnitude based on a first adaptive polar quantization of a sample of the first complex signal and computing a second quantized phase and a second quantized magnitude based on a second adaptive polar quantization of a sample of the second complex signal. The method includes computing a polar multiplication based on the first quantized phase, the first quantized magnitude, the second quantized phase, and the second quantized magnitude to generate a rotated quantized phase and a multiplied quantized magnitude; converting to component real and imaginary parts; and computing a sum using complex addition.

20 Claims, 5 Drawing Sheets

EFFICIENT CROSS-CORRELATION WITH ADAPTIVE POLAR QUANTIZATION

TECHNICAL FIELD

The present disclosure relates generally to radio frequency (RF) systems, and, more particularly, to adaptive polar quantization of RF signals.

BACKGROUND

Signal processing efficiency is a critical aspect of realizing small, light-weight, and low-power communication systems. One of the most computationally expensive functions that a communication system may perform is cross-correlation (for applications including adaptive digital beamforming and time-difference-of-arrival geolocation). As such, it may be desirable to provide systems and methods for reducing the computational expenses associated with cross-correlation processing, and the like. Signal processing cost may be greatly reduced by quantizing the input signals to a small number of bits prior to cross-correlation. However, low-resolution quantization can have a significantly negative impact on signal processing performance.

Therefore, there is a need for a system and method that can address these issues.

SUMMARY

A method for signal cross-correlation using adaptive polar quantization and polar multiplication is disclosed in accordance with one or more illustrative embodiments of the present disclosure. In one illustrative embodiment, the method may include receiving a first complex signal and a second complex signal. In another illustrative embodiment, the method may include computing a first quantized phase and a first quantized magnitude based on a first adaptive polar quantization of a sample of the first complex signal. In another illustrative embodiment, the method may include computing a second quantized phase and a second quantized magnitude based on a second adaptive polar quantization of a sample of the second complex signal. In another illustrative embodiment, the method may include computing a polar multiplication based on the first quantized phase, the first quantized magnitude, the second quantized phase, and the second quantized magnitude to generate a rotated quantized phase and a multiplied quantized magnitude. In another illustrative embodiment, the method may include converting the rotated quantized phase and the multiplied quantized magnitude to component real and imaginary parts. In another illustrative embodiment, the method may include computing a sum of the component real and imaginary parts of the multiplied quantized magnitude and the rotated quantized phase via complex addition.

In a further aspect, the method may include storing at least one of the first quantized magnitude and the first quantized phase in a first delay line and storing at least one of the second quantized magnitude and the second quantized phase in a second delay line. In another aspect, the method may include comparing the sum to a threshold. In another aspect, the computing the first quantized phase and the first quantized magnitude based on the first adaptive polar quantization of the sample of the first complex signal may include receiving the first complex signal characterized by a first real portion and a first imaginary portion, computing a first vector magnitude of the sample of the first complex signal, computing a first quantization threshold value from at least one first weighted sample of the first complex signal, comparing the first vector magnitude of the sample to the first quantization threshold value, associating the first quantized magnitude with the sample according to a comparison between the first vector magnitude of the sample and the first quantization threshold value, and associating the first quantized phase with the sample of the first complex signal. In another aspect, the computing the second quantized phase and the second quantized magnitude based on the second adaptive polar quantization of the sample of the second complex signal may include receiving the second complex signal characterized by a second real portion and a second imaginary portion, computing a second vector magnitude of the sample of the second complex signal, computing a second quantization threshold value from at least one second weighted sample of the second complex signal, comparing the second vector magnitude of the sample to the second quantization threshold value, associating the second quantized magnitude with the sample according to a comparison between the second vector magnitude of the sample and the second quantization threshold value, and associating the second quantized phase with the sample of the second complex signal.

In a further aspect, the first adaptive polar quantization and the second adaptive polar quantization may be configured to be executed via one or more adaptive polar quantization modules. In another aspect, the computing of the polar multiplication may be configured to be executed via a polar multiplication module. In another aspect, the converting of the rotated quantized phase and the multiplied quantized magnitude to the component real and imaginary parts may be configured to be executed via a polar-to-rectangular conversion module. In another aspect, the computing of the sum of the component real and imaginary parts of the multiplied quantized magnitude and the rotated quantized phase via the complex addition may be configured to be executed via a complex addition module.

A system for signal cross-correlation is disclosed in accordance with one or more illustrative embodiments of the present disclosure. In one illustrative embodiment, the system may include a controller configured to execute steps of a process based on instructions stored in memory. In another illustrative embodiment, the steps may include receiving a first complex signal and a second complex signal. In another illustrative embodiment, the steps may include computing a first quantized phase and a first quantized magnitude based on a first adaptive polar quantization of a sample of the first complex signal. In another illustrative embodiment, the steps may include computing a second quantized phase and a second quantized magnitude based on a second adaptive polar quantization of a sample of the second complex signal. In another illustrative embodiment, the steps may include computing a polar multiplication based on the first quantized phase, the first quantized magnitude, the second quantized phase, and the second quantized magnitude to generate a rotated quantized phase and a multiplied quantized magnitude. In another illustrative embodiment, the steps may include converting the rotated quantized phase and the multiplied quantized magnitude to component real and imaginary parts. In another illustrative embodiment, the steps may include computing a sum of the component real and imaginary parts of the multiplied quantized magnitude and the rotated quantized phase via complex addition.

In a further aspect, the steps may include storing at least one of the first quantized magnitude and the first quantized phase in a first delay line and storing at least one of the second quantized magnitude and the second quantized phase in a second delay line. In another aspect, the steps may include comparing the sum to a threshold. In another aspect, the computing the first quantized phase and the first quantized magnitude based on the first adaptive polar quantization of the sample of the first complex signal may include receiving the first complex signal characterized by a first real portion and a first imaginary portion, computing a first vector magnitude of the sample of the first complex signal, computing a first quantization threshold value from at least one first weighted sample of the first complex signal, comparing the first vector magnitude of the sample to the first quantization threshold value, associating the first quantized magnitude with the sample according to a comparison between the first vector magnitude of the sample and the first quantization threshold value, and associating the first quantized phase with the sample of the first complex signal. In another aspect, the computing the second quantized phase and the second quantized magnitude based on the second adaptive polar quantization of the sample of the second complex signal may include receiving the second complex signal characterized by a second real portion and a second imaginary portion, computing a second vector magnitude of the sample of the second complex signal, computing a second quantization threshold value from at least one second weighted sample of the second complex signal, comparing the second vector magnitude of the sample to the second quantization threshold value, associating the second quantized magnitude with the sample according to a comparison between the second vector magnitude of the sample and the second quantization threshold value, and associating the second quantized phase with the sample of the second complex signal.

In a further aspect, the first adaptive polar quantization and the second adaptive polar quantization may be configured to be executed via one or more adaptive polar quantization modules of the system. In another aspect, the computing of the polar multiplication may be configured to be executed via a polar multiplication module of the system. In another aspect, the converting of the rotated quantized phase and the multiplied quantized magnitude to the component real and imaginary parts may be configured to be executed via a polar-to-rectangular conversion module of the system. In another aspect, the computing of the sum of the component real and imaginary parts of the multiplied quantized magnitude and the rotated quantized phase via complex addition may be configured to be executed via a complex addition module of the system. In another aspect, the steps may further include storing the first quantized phase and the first quantized magnitude in a first delay line and storing the second quantized phase and the second quantized magnitude in a second delay line.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations (e.g., steps) of disclosed processes may be performed in an arbitrary order, unless otherwise provided in the claims.

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Signal processing efficiency is a critical aspect of realizing small, light-weight, and low-power communication systems. One of the most computationally expensive functions that a communication system may perform is cross-correlation (for applications including adaptive digital beamforming and time-difference-of-arrival geolocation). Signal processing cost may be greatly reduced by quantizing a higher-resolution input signal to a relatively smaller number of bits prior to cross-correlation. For example, a signal characterized by a relatively larger number of bits, such as a 16-bit signal, may be reduced via quantization to a smaller number of bits.

It is contemplated that in other systems for cross-correlation, such systems may include a step for high-resolution complex multiplication of the two signals. Such complex multiplication may require more bits and computation than cross-correlation embodiments of the present disclosure.

U.S. patent application Ser. No. 12/877,155, filed Sep. 8, 2010, which is hereby incorporated by reference in its entirety, discloses adaptive polar quantization.

Broadly speaking, embodiments of the inventive concepts disclosed herein are directed to a system and method for cross-correlation of two or more signals using adaptive polar quantization and polar multiplication. For example, embodiments herein may be configured to perform cross-correlation of two different signals (e.g., samples of signals) including quantizing each signal using adaptive polar quantization and also applying a polar multiplication on the quantized phases and quantized magnitudes of each quantized signal. Because the signals have undergone adaptive polar quantization, each complex multiplication may be realized as a (relatively) low-resolution polar multiplication. This polar multiplication may include a low-resolution multiplication of the input magnitudes (e.g., quantized magnitudes of each sample) to produce the output magnitude and a low-resolution addition of the input phases (e.g., quantized phases of each sample) to produce the output phase. Embodiments herein may utilize any systems, methods, elements, steps, descriptions, figures, and/or the like disclosed in U.S. patent application Ser. No. 12/877,155. For example, the embodiments, methods, steps, equations, claims, and/or the like of U.S. patent application Ser. No. 12/877,155 may be utilized for adaptive polar quantization (e.g., as a basis for an adaptive polar quantization module or the like).

Cross-correlation with adaptive polar quantization not only may reduce the number of bits that must be stored and processed, but also may eliminate the need for high-resolution complex multiplication for cross-correlation. Furthermore, this technique may adaptively retain some magnitude information, which is critical to mitigating some types of interference including narrowband interferers. Finally, the magnitude of the cross-correlation output (e.g., output 1309 of FIG. 2) may be a monotonically increasing function of the input signal-to-interference-plus-noise ratio (SINR), irrespective of the absolute magnitude of the signals, interference, or noise. As a result, further scaling or normalization may not be necessarily required prior to comparing the cross-correlation output magnitude to a threshold or when comparing cross-correlation output magnitudes to each other.

Figure 1:
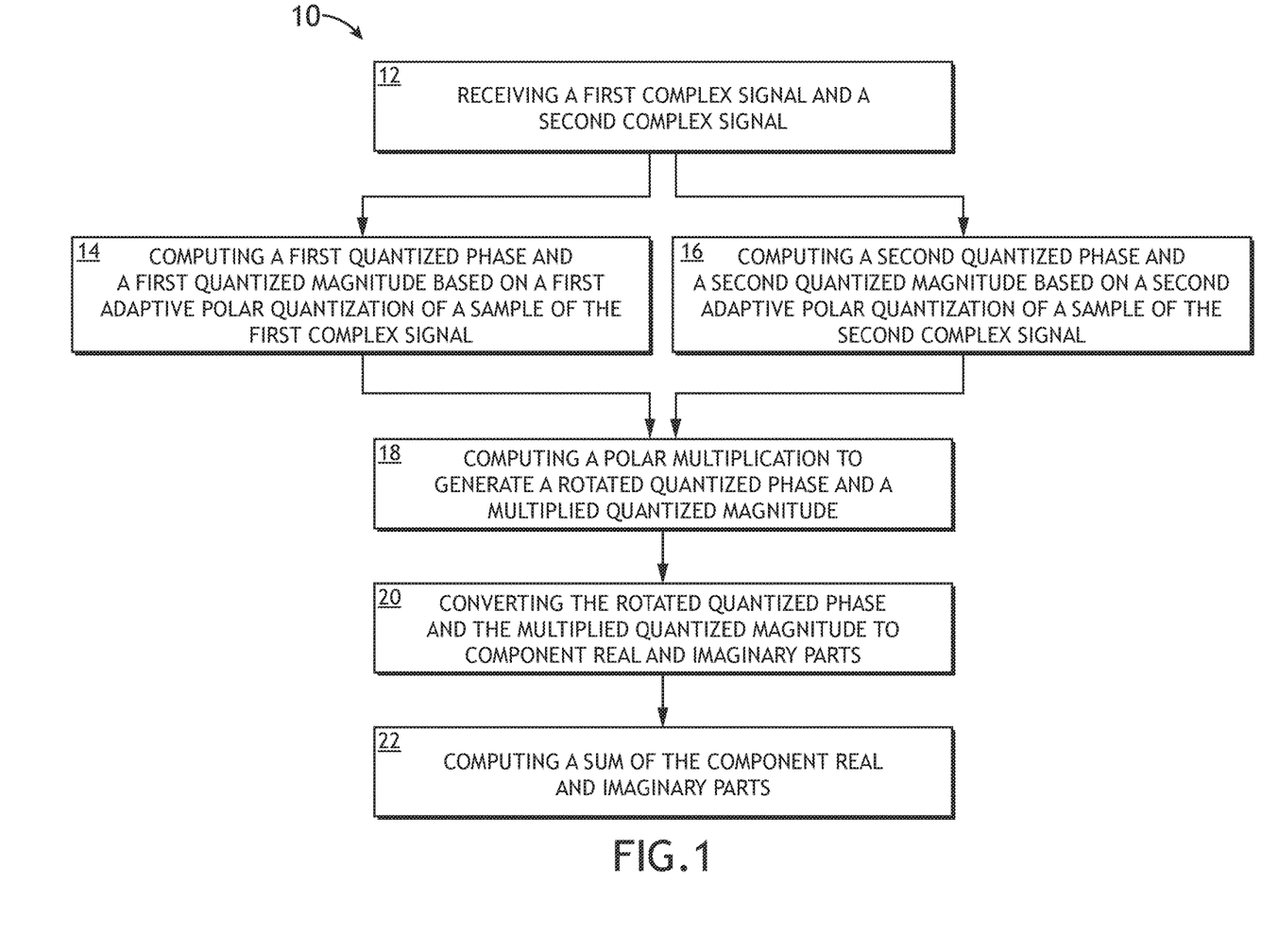
FIG. 1 is a flow diagram illustrating steps performed in a method for cross-correlation using adaptive polar quantization, in accordance with one or more embodiments of the present disclosure.
Figure 2:
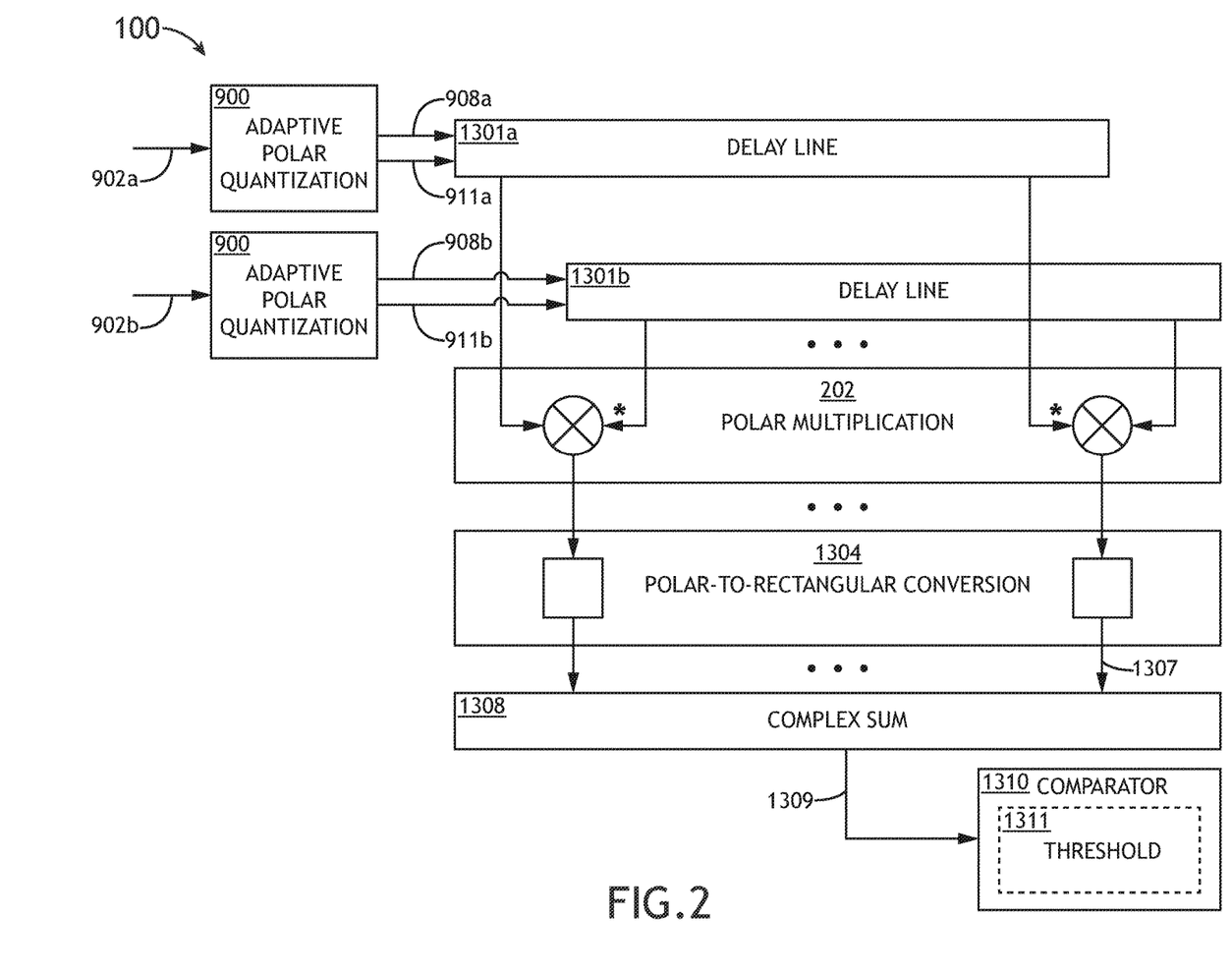
FIG. 2 is a conceptual block diagram of a system for cross-correlation using adaptive polar quantization, in accordance with one or more embodiments of the present disclosure.

FIG. 1 is a flow diagram illustrating steps performed in a method 10 for cross-correlation using adaptive polar quantization, in accordance with one or more embodiments of the present disclosure. FIG. 2 is a conceptual block diagram of a system 100 for cross-correlation using adaptive polar quantization, in accordance with one or more embodiments of the present disclosure.

Figure 3:
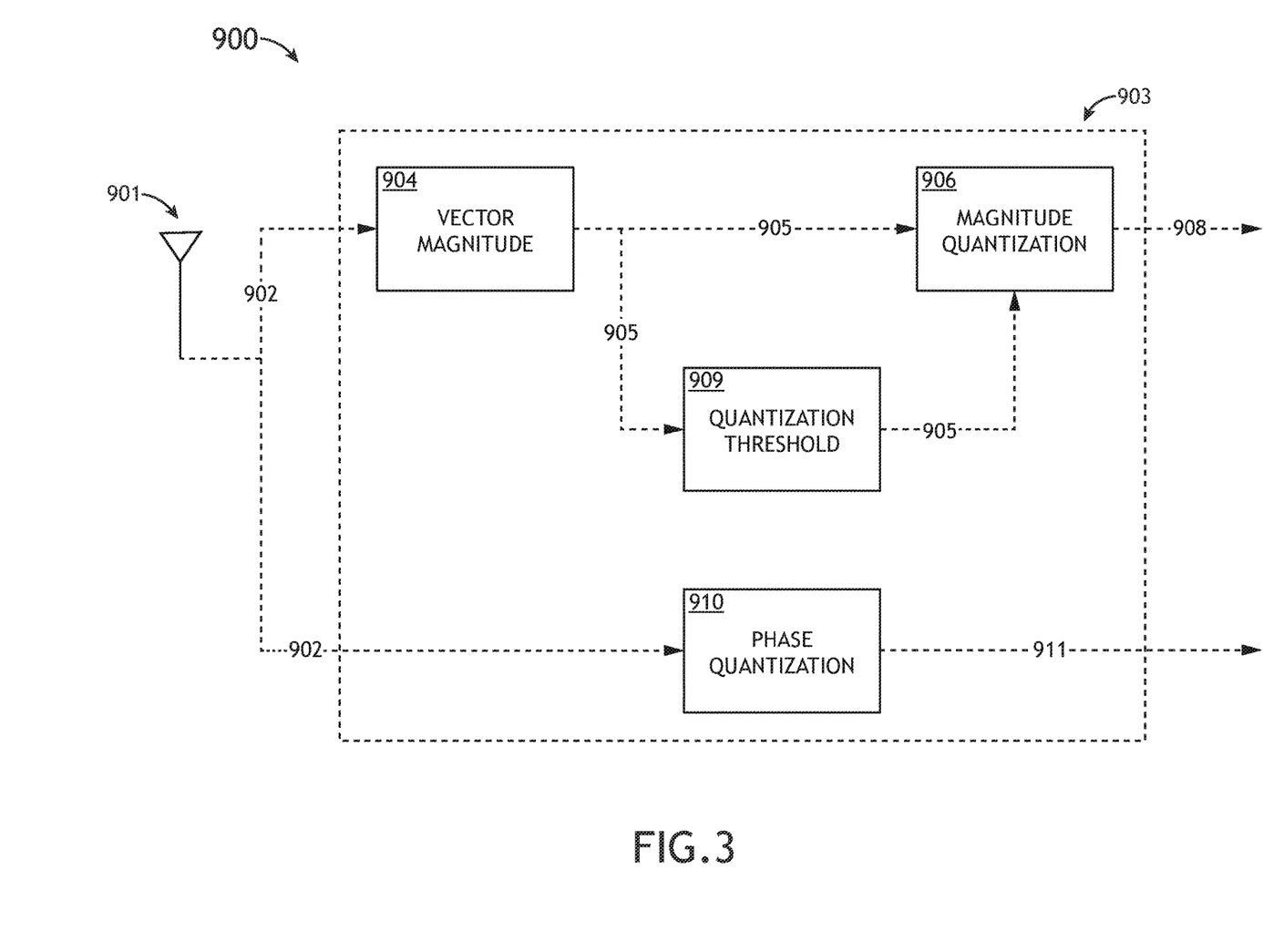
FIG. 3 is a conceptual block diagram of an adaptive polar quantization module of a system, in accordance with one or more embodiments of the present disclosure.

Step 12, referring to FIG. 1, illustrates receiving a first complex signal 902 and a second complex signal 902. For example, the first complex signal 902 may include first complex signal 902a shown in FIG. 2 characterized by a real portion and an imaginary portion. For example, as shown in FIG. 3, the adaptive polar quantization system 900 may include a receiving element 901 (e.g., an antenna and receiver, a network port, etc.). The receiving element 901 may be configured to receive at least one complex signal 902 (e.g., one or more signals including both real and imaginary components). The complex signal 902 may be received from any number of sources including, but not limited to a radio frequency source. The complex signal 902 may be a high-resolution signal (e.g., a 16-bit signal, an 8-bit signal). The complex signal 902 may be provided to an adaptive polar quantization module 903 for processing.

Step 14 illustrates computing a first quantized phase and a first quantized magnitude based on a first adaptive polar quantization of a sample of the first complex signal 902a. For example, as shown in FIG. 2, a first quantized phase 911a and a first quantized magnitude 908a may be configured to be generated/computed using an adaptive polar quantization system 900 (e.g., software code, function, application, and/or the like which may be and/or include the adaptive polar quantization module 903 of FIG. 3). Note that although shown as two systems 900 and/or two modules 903, the adaptive polar quantization system 900 may be instituted using a single system 900 and/or module 903, such as a single adaptive polar quantization software module 903 configured to quantize more than one signal 902a, 902b, but configured to send the quantized outputs 908a, 911a to a different delay line 1301 than the quantized outputs 908b, 911b.

Step 16 illustrates computing a second quantized phase and a second quantized magnitude based on a second adaptive polar quantization of a sample of the second complex signal 902b. For example, a second quantized phase 911b and a second quantized magnitude 908b may be configured to be generated using an adaptive polar quantization system 900.

Step 18 illustrates computing a polar multiplication to generate a rotated quantized phase and a multiplied quantized magnitude. For example, a polar multiplication module 202 as shown in FIG. 2 may be configured to generate the rotated quantized phase and the multiplied quantized magnitude based on the first quantized phase 911a, the first quantized magnitude 908a, the second quantized phase 911b, and the second quantized magnitude 908b. For example, as shown in FIG. 2, each field of each delay line 1301a, 1301b includes a stored quantized magnitude 908a, 908b and a stored quantized phase 911a, 911b, which may be provided as an input to a polar multiplication module 202. As the signals are in polar form (e.g., quantized magnitudes 908a, 908b and quantized phases 911a, 911b) as opposed to rectangular form, the phase can be manipulated by addition (i.e., phase rotation) rather than complex multiplication and the magnitude may be manipulated by (relatively low resolution) real multiplication rather than complex multiplication. the multiplied quantized magnitude to component real and imaginary parts. For example, as shown in FIG. 2, each multiplied quantized magnitude and rotated quantized phase may be provided to a polar-to-rectangular conversion module 1304. Each multiplied quantized magnitude and rotated quantized phase may be converted into real and imaginary components 1307 by the polar-to-rectangular conversion module 1304. For example, the polar-to-rectangular conversion module 1304 may produce the real and imaginary parts 1307 of the multiplied quantized magnitude and rotated quantized phase as a unit-vector.

Step 22 illustrates computing a sum 1309 of the component real and imaginary parts 1307. For example, a sum 1309 of the component real and imaginary parts 1307 may be computed using complex addition. For example, as shown in FIG. 2, a complex addition module 1308 may receive the component real and imaginary parts 1307 from the polar-to-rectangular conversion module 1304 and compute a complex sum 1309 of those real and imaginary components 1307.

Consider the following simplified example scenario of a three-sample cross-correlation between a Signal 1 (e.g., signal 902a) and a Signal 2 (e.g., signal 902b) using adaptive polar quantization. In such a scenario, these signals may be characterized by a 16-bit signed real part and a 16-bit signed imaginary part. For instance, Signal 1 may include three samples: 1+0i, 2871+16280i, and −533+3025i. Similarly, Signal 2 may include three samples: −7+1i, −2824−7758i, and 2064−3575i.

In such an example scenario, the adaptive polar quantization is then applied to these signals, with a 1-bit magnitude (possible values 1, 2) and a 3-bit phase (possible values 0, 1, 2, 3, 4, 5, 6, 7). For Signal 1, the quantized magnitudes of the three samples may be 1, 2, and 1, and the quantized phases may be 0, 2, and 2. For Signal 2, the quantized magnitudes of the three samples may be 1, 2, and 2, and the quantized phases may be 4, 6, and 7.

In such an example scenario, following the adaptive polar quantization, a polar multiplication output is computed (e.g., computed using the polar multiplication module 202). This output has a 2-bit magnitude (possible values 1, 2, 4) and a 3-bit phase (possible values 0, 1, 2, 3, 4, 5, 6, 7). The magnitude is calculated by multiplying the magnitude of Signal 1 by the magnitude of Signal 2, resulting in values of 1, 4, and 2. The phase is calculated by subtracting the phase of Signal 2 from the phase of Signal 1, modulo 8, resulting in values of 4, 4, and 3.

In such an example scenario, the polar multiplication output is then converted from polar to rectangular form computed (e.g., converted using the polar-to-rectangular conversion module 1304). This conversion results in a 5-bit signed real part and a 5-bit signed imaginary part. For example, the converted output may include three samples: −3−1i, −12−4i, and −6+2i.

Finally, in such an example scenario, a complex sum is computed (e.g., computed using the complex addition module 1308), characterized by a 7-bit signed real part and a 7-bit signed imaginary part. In this example, the complex sum of the converted output is −21−3i. This example scenario illustrates the efficiency and effectiveness of the disclosed system and method for cross-correlation using adaptive polar quantization.

As shown in FIG. 2, the sum 1309 may be compared to a threshold 1311. For example, a comparator module 1310 may receive the complex sum 1309 and compare it to a threshold 1311. The threshold 1311 may be predetermined. If the complex sum 1309 is greater than the threshold 1311, the system 100 may determine that the first complex signal 902a and the second complex signal 902b are cross correlated. In embodiments, for a cross-correlation, the system 100 may forward either the high-resolution complex signals 902a, 902b, or the quantized magnitude 908a and quantized phase 911a on to additional system resources for additional processing. For instance, such a cross-correlation may be used by the system 100 for applications such as adaptive digital beamforming and time-difference-of-arrival geolocation. By way of another example, cross-correlation may be used in radar detection. For example, a transmitted signal (e.g., signal 902b) may be transmitted by a radar system and a received signal (e.g., noisy signal) such as signal 902a may be compared with the transmitted signal to determine whether a target (e.g., object) is detected—where the target causes a reflected and received signal which cross correlates with the transmitted signal. For example, the transmitted signal may be received from a memory (e.g., known ahead of time) and the received signal may be received from an antenna (i.e., measured). Such cross-correlations may be computationally expensive using other systems.

Figure 4:
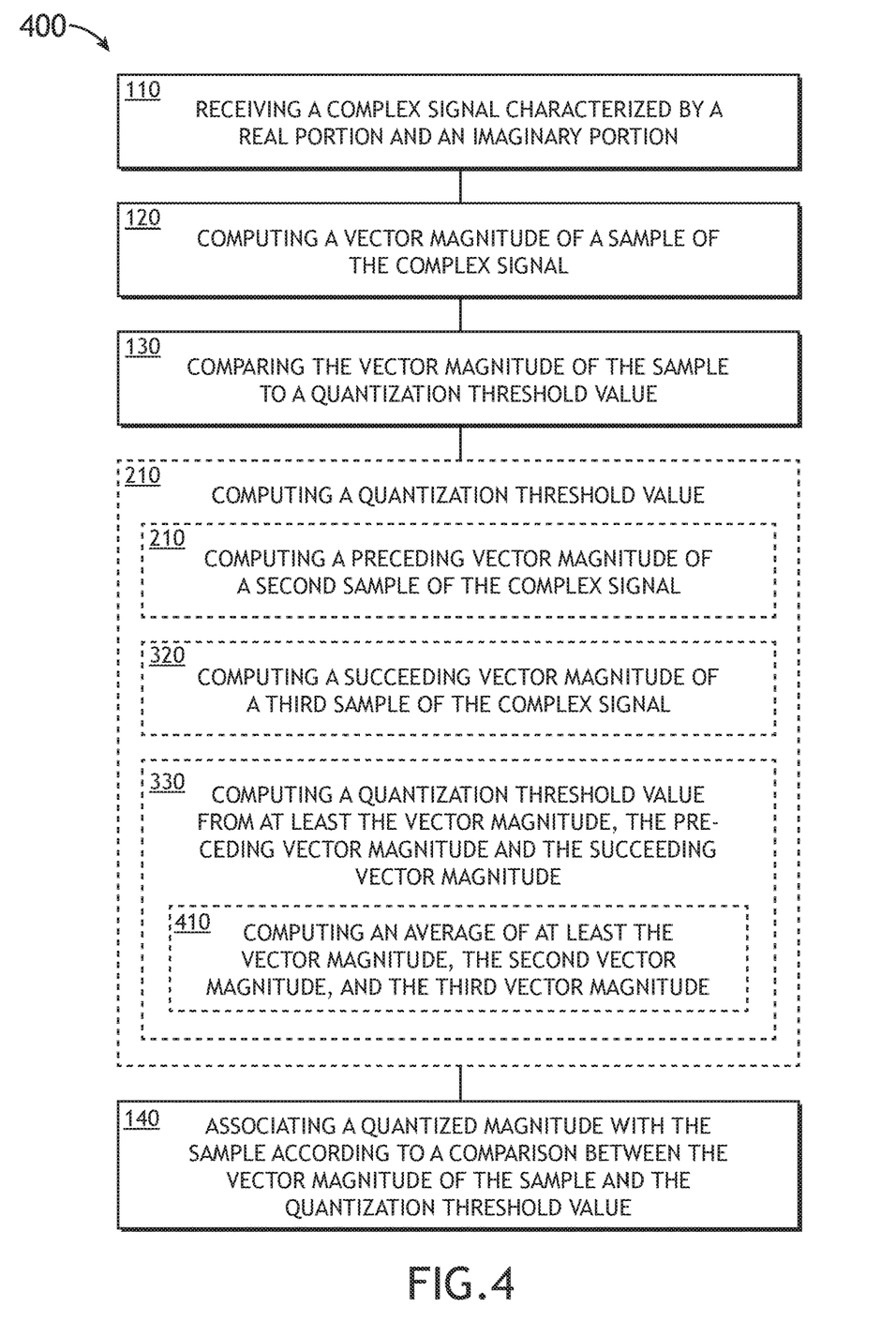
FIG. 4 is a flow diagram illustrating steps performed in a method for adaptive polar quantization, in accordance with one or more embodiments of the present disclosure.

FIGS. 3 and 4 disclose embodiments of adaptive polar quantization. At least some of FIG. 3 and FIG. 4 may be similar to portions of the disclosure of U.S. patent application Ser. No. 12/877,155, filed Sep. 8, 2010, which is hereby incorporated by reference in its entirety.

FIG. 3 is a conceptual block diagram of an adaptive polar quantization system 900 that includes an adaptive polar quantization module 903, in accordance with one or more embodiments of the present disclosure. FIG. 3 may be understood in reference to FIG. 4.

FIG. 4 illustrates a flow diagram illustrating steps performed in a method 400 for adaptive polar quantization, in accordance with one or more embodiments of the present disclosure. For example, method 400 may be configured to be performed using an adaptive polar quantization module 903 of a system 100. FIG. 4 illustrates example operations/steps related to adaptive polar quantization. In FIG. 4 and other figures that include various examples of steps, discussion and explanation may be provided with respect to the high-level block diagram of an adaptive polar quantization system 900 as shown in FIG. 3, and a system 100 incorporating the adaptive polar quantization system 900 (e.g., adaptive polar quantization module 903) as shown in FIG. 3, and/or with respect to other examples and contexts. However, it should be understood that the operational flows, steps, and the like may be executed in a number of other environments and contexts, and/or in modified versions of FIGS. 2 and 3. Also, although the various operational flows are presented in the sequence(s) illustrated, it should be understood that the various operations may be performed in other orders than those which are illustrated, or may be performed concurrently.

As shown in FIG. 4, method 400 may include one or more operations for carrying out adaptive polar quantization. For example, method 400 may include operations 110, 120, 130, and/or 140.

Step 110 illustrates receiving a complex signal (e.g., complex signal 902a or complex signal 902b) characterized by a real portion and an imaginary portion. For example, as shown in FIG. 3, the adaptive polar quantization system 900 may include a receiving element 901 (e.g., an antenna and receiver, a network port, etc.). The receiving element 901 may be configured to receive at least one complex signal 902 (e.g., one or more signals including both real and imaginary components). The complex signal 902 may be received from any number of sources including, but not limited to a radio frequency source. The complex signal 902 may be a high-resolution signal (e.g., a 16-bit signal, an 8-bit signal). The complex signal 902 may be provided to an adaptive polar quantization module 903 for processing.

Step 120 illustrates computing a vector magnitude of a sample of the complex signal. For example, as shown in FIG. 3, a vector magnitude module 904 may receive the high-resolution complex signal 902 and extract a sample of that complex signal 902 (e.g., sampling an output of an analog-to-digital converter) at a time $t_i$. A vector magnitude 905 of that sample be may computed according to:

$$\text{vector\_magnitude}_{t_i} = \sqrt{\{\text{square root over}(\text{sample}_{ti,real}^2 + \text{sample}_{ti,imag}^2)\}} \quad \text{(Eqn. 1)}$$

where $\text{sample}_{real}$ is the real component of the complex signal 902 and $\text{sample}_{imag}$ is the imaginary component of the complex signal 902.

Step 130 illustrates comparing the vector magnitude of the sample to a quantization threshold value. For example, as shown in FIG. 3, a magnitude quantization module 906 may receive the vector magnitude 905. The magnitude quantization module 906 may then compare the vector magnitude 905 to a quantization threshold value 907. The quantization threshold value 907 may be a user-defined value or may be dynamically determined by the adaptive polar quantization system 900. A determination may be made by the magnitude quantization module 906 whether the vector magnitude 905 is greater than or less than the quantization threshold value 907 and a quantized magnitude 908 may be determined according to the determination.

A module (e.g., adaptive polar quantization module 903, or any other module), sub-module (e.g., magnitude quantization module 906), or the like herein may be implemented by and/or include, for example, code (e.g., heuristic code such as C++, Python, Java, and/or the like) of a function, program, application, and/or the like that is stored on a memory of a controller (e.g., controller 112 of FIG. 5) and, when executed, is configured to perform the one or more steps herein. A module may also be implemented using at least some hardware structure beyond software-based execution hardware, such as field programmable gate arrays (FPGAs) configured to add, multiply, use look up tables (LUTs) of the FPGA to execute functions and algorithms, and/or the like.

Step 140 illustrates associating a quantized magnitude with the sample according to a comparison between the vector magnitude of the sample and the quantization threshold value. For example, as shown in FIG. 3, the magnitude quantization module 906 may associate a particular quantized magnitude 908 with the vector magnitude 905 according to the comparison between the vector magnitude 905 and the quantization threshold value 907. For example, in a simplified quantization case, if the vector magnitude 905 is greater than or equal to the quantization threshold value 907, a quantized magnitude 908 associated with the vector magnitude 905 may be assigned a value of "1." If the vector magnitude 905 is less than the quantization threshold value 907, a quantized magnitude 908 associated with the vector magnitude 905 may be assigned a value of "0." In such a manner, a high-resolution complex signal 902 (e.g., a 16-bit complex signal) may be quantized to a 1-bit low-resolution representation to reduce computational expenses associated with downstream processing of the complex signal 902. It will be noted that other multi-bit magnitude quantization configurations are contemplated so as to provide varying levels of processing enhancement.

Additional steps may include a step 210.

Step 210 illustrates computing a quantization threshold value. For example, as shown in FIG. 3, a quantization threshold module 909 may receive one or more vector magnitude 905 samples from the vector magnitude module 904. The quantization threshold module 909 may conduct a statistical analysis of the one or more vector magnitude 905 samples to compute the quantization threshold value 907. The computed quantization threshold value 907 may be provided to the magnitude quantization module 906 to allow for the association of a quantized magnitude 908 with the vector magnitude 905 as described above.

Step 310 illustrates computing a preceding vector magnitude of a preceding sample of the complex signal. For example, as shown in FIG. 3, the vector magnitude module 904 may receive the complex signal 902 and extract a preceding sample of that complex signal 902 (e.g. a sample taken at a previous point in time $t_{i-1}$ with respect to a time for a first sample, $t_i$, as described above). A preceding vector magnitude 905 associated with the preceding sample may be computed according to:

$$\text{vector\_magnitude}_{t\ i-1} = \sqrt{\text{square root over}(\text{sample}_{t\ i-1,real}^2 + \text{sample}_{t\ i-1,imag}^2)} \quad \text{(Eqn. 1)}$$

where $\text{sample}_{real}$ is the real component of the complex signal 902 and $\text{sample}_{imag}$ is the imaginary component of the complex signal 902.

Step 320 illustrates computing a succeeding vector magnitude of a succeeding sample of the complex signal. For example, as shown in FIG. 3, the vector magnitude module 904 may receive the complex signal 902 and extract a succeeding sample of that complex signal 902 (e.g. a sample taken at a subsequent point in time $t_{n+1}$ with respect to a time for a first sample, $t_n$, as described above). A succeeding vector magnitude 905 associated with the succeeding sample may be computed according to:

$$\text{vector\_magnitude}_{t\ i+1} = \sqrt{\text{square root over}(\text{sample}_{t\ i+1,real}^2 + \text{sample}_{t\ i+1,imag}^2)} \quad \text{(Eqn. 1)}$$

where $\text{sample}_{real}$ is the real component of the complex signal 902 and $\text{sample}_{imag}$ is the imaginary component of the complex signal 902.

Step 330 illustrates computing a quantization threshold value from at least the vector magnitude, the preceding vector magnitude and the succeeding vector magnitude. For example, as shown in FIG. 3, the first vector magnitude 905, the preceding vector magnitude 905 and the succeeding vector magnitude 905 may be received by the quantization threshold module 909 from the vector magnitude module 904. The quantization threshold module 909 may conduct a statistical analysis of the first vector magnitude 905, the preceding vector magnitude 905 and the succeeding vector magnitude 905 to compute the quantization threshold value 907.

Step 410 illustrates computing an average of at least the vector magnitude, the preceding vector magnitude, and the succeeding vector magnitude. For example, as shown in FIG. 3, the quantization threshold module 909 may receive the first vector magnitude 905, the preceding vector magnitude 905 and the succeeding vector magnitude 905 from the vector magnitude module 904. The quantization threshold module 909 may conduct a statistical analysis of the first vector magnitude 905, the preceding vector magnitude 905 and the succeeding vector magnitude 905 to compute the quantization threshold value 907. For example, the quantization threshold value 907 may be a simple average of the first vector magnitude 905 (e.g. at time $t_i$), the preceding vector magnitude 905 (e.g. at time $t_{i-1}$) and the succeeding vector magnitude 905 (e.g. at time $t_{i+1}$) to yield the quantization threshold value 907 associated with the vector magnitude 905 obtained at time $t_n$ may be:

$$\text{quantization\_threshold}_{ti} = (\text{vector\_magnitude}_{ti-1} + \text{vector\_magnitude}_{ti} + \text{vector\_magnitude}_{ti+1})/3$$

For instance, a weighted average of the first vector magnitude 905 (e.g., at time ti) and various other vector magnitudes may be computed. For example, less emphasis may be placed on vector magnitude 905 samples taken at times distant (e.g. at times ti+2 and ti−2) from a vector magnitude 905 currently subject to quantization (e.g. the first vector magnitude 905 sampled at time ti) In such a case, such a vector magnitude 905 may be multiplied by a first coefficient "a." Further, more emphasis may be placed on vector magnitude 905 samples taken at times more proximate (e.g. at times ti+2 and ti−2) to a vector magnitude 905 currently subject to quantization (e.g. the first vector magnitude 905 sampled at time ti).

A step may include associating a quantized phase with the sample. For example, as shown in FIG. 3, a phase quantization module 910 may receive the high-resolution complex signal 902 and extract a sample of that complex signal 902 (e.g., sampling an output of an analog-to-digital converter) at a time ti. A quantized phase 911 of that sample may be computed by using the signs of the real and imaginary parts to determine which quadrant the phase lies in (2-bit phase quantization). Alternately, within a quadrant, the magnitudes of the real and imaginary parts may be compared to determine which octant the phase lies in (3-bit phase quantization). A look-up table may be used to achieve more resolution within an octant.

A step (not shown) illustrates storing at least one of the quantized magnitudes 908a, 908b and the quantized phases 911a, 911b in at least one field of a delay line 1301a, 1301b. For example, as shown in FIG. 2, one or more quantized magnitude 908a samples and the quantized phase 911a samples may be stored in a delay line 1301a, which may include and/or be a shift register, over a period of time (e.g., from time t0 to time tn). The system 100 may include a first delay line 1301a and a second delay line 1301b (e.g., for the quantized magnitude 908b samples and the quantized phase 911b samples). Values in the delay line may be stored in a first-in-first-out manner. Outputs for various cross-correlation lags are obtained by varying the relative delay between the two delay lines such that different samples of the signals may be compared at different times, as is known.

Figure 5:
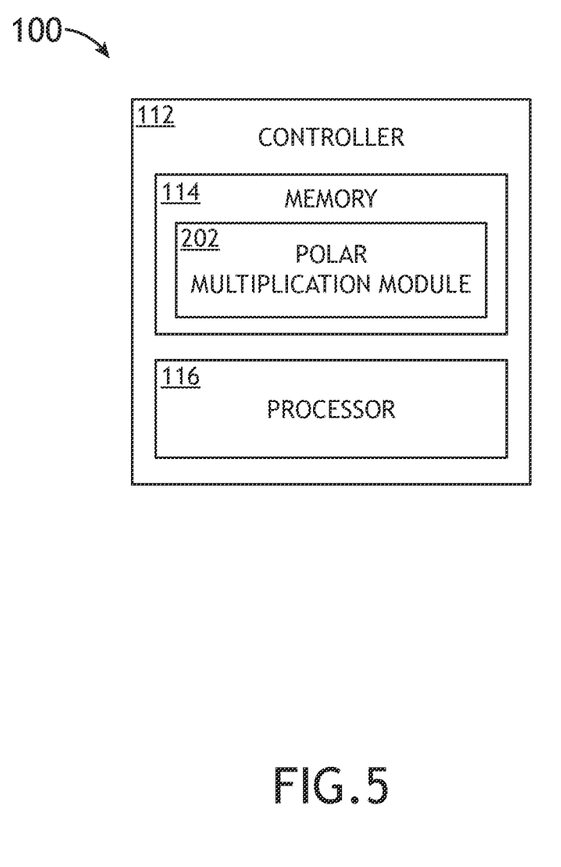
FIG. 5 is a conceptual block diagram of a system for cross-correlation using adaptive polar quantization and polar multiplication, in accordance with one or more embodiments of the present disclosure.

FIG. 5 illustrates a conceptual block diagram of a system 100 for cross-correlation using adaptive polar quantization and polar multiplication, in accordance with one or more embodiments of the present disclosure. For example, a polar multiplication module 202 and/or any other module and/or sub-module for cross-correlation may be stored on a memory 114 of a controller 112.

The one or more processors 116 of controller 112 may include any one or more processing elements known in the art. In this sense, the one or more processors 116 may include any microprocessor device configured to execute algorithms and/or instructions. In one embodiment, the one or more processors 116 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 114). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium 114 may include any storage medium known in the art suitable for storing program instructions executable by the associated one or more processors 116. For example, the memory medium 114 may include a non-transitory memory medium. For instance, the memory medium 114 may include, but is not limited to, a read-only memory, a random access memory, a magnetic or optical memory device (e.g., disk), a magnetic tape, a solid state drive and the like. In another embodiment, it is noted herein that the memory 114 is configured to store one or more results from the system 100 and/or the output of the various steps described herein. It is further noted that memory 114 may be housed in a common controller housing with the one or more processors 116. In an alternative embodiment, the memory 114 may be located remotely with respect to the physical location of the processors and controller 112. For instance, the one or more processors 116 of controller 112 may access a remote memory (e.g., server), accessible through a network (e.g., internet, intranet and the like). In another embodiment, the memory medium 114 stores the program instructions for causing the one or more processors 116 to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 112 of the system 100 may be configured to receive and/or acquire data or information from other systems by a transmission medium that may include wireline and/or wireless portions. In another embodiment, the controller 112 of the system 100 may be configured to transmit data or information (e.g., the output of one or more processes disclosed herein) to one or more systems or sub-systems by a transmission medium that may include wireline and/or wireless portions. In this manner, the transmission medium may serve as a data link between the controller 112 and other subsystems of the system 100. Moreover, the controller 112 may send data to external systems via a transmission medium (e.g., network connection).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for signal cross-correlation comprising:
   1a) receiving a first complex signal and a second complex signal;
   1b) computing a first quantized phase and a first quantized magnitude based on a first adaptive polar quantization of a sample of the first complex signal;
   1c) computing a second quantized phase and a second quantized magnitude based on a second adaptive polar quantization of a sample of the second complex signal;
   2) Computing a polar multiplication based on the first quantized phase, the first quantized magnitude, the second quantized phase, and the second quantized magnitude to generate a rotated quantized phase and a multiplied quantized magnitude;
   3) Converting the rotated quantized phase and the multiplied quantized magnitude to component real and imaginary parts; and
   4) Computing a sum of the component real and imaginary parts of the multiplied quantized magnitude and the rotated quantized phase via complex addition.

2. The method of claim 1 further comprising storing at least one of the first quantized magnitude and the first quantized phase in a first delay line; and storing at least one of the second quantized magnitude and the second quantized phase in a second delay line.

3. The method of claim 1 further comprising comparing the sum to a threshold.

4. The method of claim 1, wherein the computing the first quantized phase and the first quantized magnitude based on the first adaptive polar quantization of the sample of the first complex signal comprises:
   receiving the first complex signal characterized by a first real portion and a first imaginary portion;
   computing a first vector magnitude of the sample of the first complex signal;
   computing a first quantization threshold value from at least one first weighted sample of the first complex signal;
   comparing the first vector magnitude of the sample to the first quantization threshold value;
   associating the first quantized magnitude with the sample according to a comparison between the first vector magnitude of the sample and the first quantization threshold value; and
   associating the first quantized phase with the sample of the first complex signal.

5. The method of claim 1, wherein the computing the second quantized phase and the second quantized magnitude based on the second adaptive polar quantization of the sample of the second complex signal comprises:
   receiving the second complex signal characterized by a second real portion and a second imaginary portion;
   computing a second vector magnitude of the sample of the second complex signal;
   computing a second quantization threshold value from at least one second weighted sample of the second complex signal;
   comparing the second vector magnitude of the sample to the second quantization threshold value;
   associating the second quantized magnitude with the sample according to a comparison between the second vector magnitude of the sample and the second quantization threshold value; and
   associating the second quantized phase with the sample of the second complex signal.

6. The method of claim 1, wherein the first adaptive polar quantization and the second adaptive polar quantization are configured to be executed via one or more adaptive polar quantization modules.

7. The method of claim 1, wherein the computing of the polar multiplication is configured to be executed via a polar multiplication module.

8. The method of claim 1, wherein the converting of the rotated quantized phase and the multiplied quantized magnitude to the component real and imaginary parts is configured to be executed via a polar-to-rectangular conversion module.

9. The method of claim 1, wherein the computing of the sum of the component real and imaginary parts of the multiplied quantized magnitude and the rotated quantized phase via the complex addition is configured to be executed via a complex addition module.

10. The method of claim 1 further comprising storing the first quantized phase and the first quantized magnitude in a first delay line and storing the second quantized phase and the second quantized magnitude in a second delay line.

11. A system for signal cross-correlation comprising:
    a controller configured to execute steps of a process based on instructions stored in memory, the steps comprising:
      receiving a first complex signal and a second complex signal;
      computing a first quantized phase and a first quantized magnitude based on a first adaptive polar quantization of a sample of the first complex signal;
      computing a second quantized phase and a second quantized magnitude based on a second adaptive polar quantization of a sample of the second complex signal;
      computing a polar multiplication based on the first quantized phase, the first quantized magnitude, the second quantized phase, and the second quantized magnitude to generate a rotated quantized phase and a multiplied quantized magnitude;
      converting the rotated quantized phase and the multiplied quantized magnitude to component real and imaginary parts; and
      computing a sum of the component real and imaginary parts of the multiplied quantized magnitude and the rotated quantized phase via complex addition.

12. The system of claim 11, the steps further comprising storing at least one of the first quantized magnitude and the first quantized phase in a first delay line; and storing at least one of the second quantized magnitude and the second quantized phase in a second delay line.

13. The system of claim 11, the steps further comprising comparing the sum to a threshold.

14. The system of claim 11, wherein the computing the first quantized phase and the first quantized magnitude based on the first adaptive polar quantization of the sample of the first complex signal comprises:
- receiving the first complex signal characterized by a first real portion and a first imaginary portion;
- computing a first vector magnitude of the sample of the first complex signal;
- computing a first quantization threshold value from at least one first weighted sample of the first complex signal;
- comparing the first vector magnitude of the sample to the first quantization threshold value;
- associating the first quantized magnitude with the sample according to a comparison between the first vector magnitude of the sample and the first quantization threshold value; and
- associating the first quantized phase with the sample of the first complex signal.

15. The system of claim 11, wherein the computing the second quantized phase and the second quantized magnitude based on the second adaptive polar quantization of the sample of the second complex signal comprises:
- receiving the second complex signal characterized by a second real portion and a second imaginary portion;
- computing a second vector magnitude of the sample of the second complex signal;
- computing a second quantization threshold value from at least one second weighted sample of the second complex signal;
- comparing the second vector magnitude of the sample to the second quantization threshold value;
- associating the second quantized magnitude with the sample according to a comparison between the second vector magnitude of the sample and the second quantization threshold value; and
- associating the second quantized phase with the sample of the second complex signal.

16. The system of claim 11, wherein the first adaptive polar quantization and the second adaptive polar quantization are configured to be executed via one or more adaptive polar quantization modules of the system.

17. The system of claim 11, wherein the computing of the polar multiplication is configured to be executed via a polar multiplication module of the system.

18. The system of claim 11, wherein the converting of the rotated quantized phase and the multiplied quantized magnitude to the component real and imaginary parts is configured to be executed via a polar-to-rectangular conversion module of the system.

19. The system of claim 11, wherein the computing of the sum of the component real and imaginary parts of the multiplied quantized magnitude and the rotated quantized phase via complex addition is configured to be executed via a complex addition module of the system.

20. The system of claim 11, the steps further comprising storing the first quantized phase and the first quantized magnitude in a first delay line and storing the second quantized phase and the second quantized magnitude in a second delay line.

* * * * *